United States Patent
Hui et al.

(10) Patent No.: US 11,072,715 B2
(45) Date of Patent: Jul. 27, 2021

(54) FINE SILVER PARTICLE DISPERSION

(71) Applicant: E I DU PONT DE NEMOURS AND COMPANY, Wilmington, DE (US)

(72) Inventors: Dave Hui, Bristol South Gloucestershire (GB); Michael Stephen Wolfe, Wilmington, DE (US); Howard David Glicksman, Durham, NC (US); Haixin Yang, Durham, NC (US); Takashi Hinotsu, Tokyo (JP); Shingo Teragawa, Tokyo (JP)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 90 days.

(21) Appl. No.: 16/375,095

(22) Filed: Apr. 4, 2019

(65) Prior Publication Data
US 2020/0317935 A1    Oct. 8, 2020

(51) Int. Cl.
| | | |
|---|---|---|
| *C09D 101/28* | (2006.01) | |
| *C09D 5/24* | (2006.01) | |
| *C08K 3/40* | (2006.01) | |
| *C08K 3/08* | (2006.01) | |
| *C08K 9/04* | (2006.01) | |

(52) U.S. Cl.
CPC ............. *C09D 5/24* (2013.01); *C09D 101/28* (2013.01); *C08K 3/40* (2013.01); *C08K 9/04* (2013.01); *C08K 2003/0806* (2013.01); *C08K 2201/001* (2013.01); *C08K 2201/003* (2013.01)

(58) Field of Classification Search
CPC ....... B82Y 30/00; B22F 1/0062; H05K 1/092; C09D 101/00
See application file for complete search history.

(56) References Cited

U.S. PATENT DOCUMENTS

| | | | |
|---|---|---|---|
| 2016/0297982 A1 | 10/2016 | Hinotsu et al. | |
| 2017/0259333 A1* | 9/2017 | Nakanoya | ............. B22F 1/0062 |
| 2018/0193913 A1* | 7/2018 | Iwai | ....................... H05K 1/092 |
| 2019/0119519 A1* | 4/2019 | Watanabe | .............. B82Y 30/00 |
| 2021/0024766 A1* | 1/2021 | Chou | ................ H01L 23/49883 |

OTHER PUBLICATIONS

Thick film technology Source : http://www.ami.ac.uk/courses/topics/.

* cited by examiner

*Primary Examiner* — Khanh T Nguyen
(74) *Attorney, Agent, or Firm* — Hong Xu

(57) ABSTRACT

This disclosure relates to a conductive paste comprising a fine silver particle dispersion and a glass frit, wherein the fine silver particle dispersion comprising: (1) 65 to 95.4% by weight of fine silver particles which have average primary particle diameter of 10 to 190 nm and which comprise 25% by number or less of silver particles having primary particle diameter of 100 nm or larger, (2) 4.5 to 34.5% by weight of a solvent, (3) 0.1 to 1.0% by weight of ethyl cellulose having weight average molecular weight of 10,000 to 120,000. Also provided are: a method of manufacturing an electrically conductive thick film comprising steps of: (a) applying said fine silver particle dispersion on a substrate, and (b) heating the applied fine silver particle dispersion at 80 to 1000° C.; and an electrical device comprising a conductive thick film made with the foregoing paste.

15 Claims, No Drawings

FINE SILVER PARTICLE DISPERSION

The present invention was developed under a joint development agreement between E.I. du Pont de Nemours and Company and Dowa Electronics Materials Co., Ltd.

CROSS REFERENCE TO RELATED APPLICATIONS

This subject matter of this application is related to that of (i) an application entitled "FINE SILVER PARTICLE DISPERSION" that is being filed contemporaneously with this application; (ii) U.S. application Ser. No. 15/724,378, filed on Oct. 4, 2017, and (iii) U.S. application Ser. No. 15/724,392, filed on Oct. 4, 2017.

FIELD OF THE INVENTION

The present invention relates generally to a fine silver particle dispersion. More specifically, the invention relates to a fine silver particle dispersion used for forming an electrically conductive thick film of electrical devices.

TECHNICAL BACKGROUND OF THE INVENTION

Fine silver particle dispersions that contain fine silver particles dispersed in a solvent are used for forming an electrically conductive thick film. The film can be used to form a circuit, an electrode or an electrically conductive bonding layer.

US20160297982 discloses a silver particle dispersion. The silver particle dispersion contains fine silver particles (the content of silver in the fine silver particle dispersing solution is 30 to 90% by weight), which have primary particle diameter of 1 to 100 nm and which are coated with an amine having a carbon number of 8 to 12, such as octylamine, serving as an organic protective material; a polar solvent (5 to 70% by weight) having a boiling point of 150 to 300° C.; and an acrylic dispersing agent (1.5 to 5% by weight with respect to the fine silver particles), such as a dispersing agent of at least one of acrylic acid ester and methacrylic acid ester.

SUMMARY OF THE INVENTION

An objective is to provide a fine silver particle dispersion that has good storage stability of resistivity and that can be used for forming an electrically conductive thick film with a good surface smoothness and low resistivity.

An aspect relates to a fine silver particle dispersion comprising: (1) 65 to 95.4% by weight of fine silver particles which have an average primary particle diameter of 10 to 190 nm and which comprise 25% by number or less of silver particles having a primary particle diameter of 100 nm or larger, (2) 4.5 to 34.5% by weight of a solvent, (3) 0.1 to 1.0% by weight of ethyl cellulose having a weight average molecular weight of 10,000 to 120,000.

A fine silver particle dispersion that has good storage stability of resistivity and that can be used for forming an electrically conductive thick film with a good surface smoothness and low resistivity can be provided by the present invention.

Further aspects relate to a conductive paste comprising the foregoing fine silver particle dispersion and a glass frit, an electrical device comprising a conductive thick film made with such paste, and a method of manufacturing an electrically conductive thick film using such paste.

DESCRIPTION OF THE PREFERRED EMBODIMENTS

Fine Silver Particle Dispersion

A fine silver particle dispersion comprises fine silver particles, a solvent and ethyl cellulose having a specific weight average molecular weight.

Fine Silver Particles

The fine silver particles have an average primary particle diameter of 10 to 190 nm and comprise 25% by number or less of silver particles having a primary particle diameter of 100 nm or larger. The fine silver particles with the average primary particle diameter impart low resistivity to an electrically conductive thick film formed from the fine silver particle dispersion. Further, when number percentage of silver particles with a primary particle diameter of 100 nm or larger is more than 25%, resistivity of the electrically conductive thick film formed from the fine silver particle dispersion is high. Also, the fine silver particles which have the above small average primary particle diameter and have small number of medium to large size particles (100 nm or larger) are suitable for sintering at a low temperature. In some embodiments, the fine silver particles in the dispersion can comprise 15% by number or less of silver particles having a primary particle diameter of 100 nm or larger, and in some embodiments can comprise 10% by number or less of silver particles having a primary particle diameter of 100 nm or larger.

The average primary particle diameter of the fine silver particles is 10 to 150 nm in an embodiment, 25 to 110 nm in another embodiment, 30 to 85 nm in another embodiment, 50 to 70 nm in another embodiment. The primary particle diameter is measured by analyzing an image picture with an image analysis software (A-zo-kun®, Asahi Kasei Engineering Corporation). The image picture can be taken by a scanning electron microscope (SEM) (S-4700, Hitachi High-Technologies Corporation) or a transmission electron microscope (TEM) (JEM-1011, Japan Electron Optics Laboratory Ltd.). The average primary particle diameter of the fine silver particles is calculated as an average value of primary particle diameters of more than 100 arbitrary fine silver particles in the image picture.

The fine silver particles are coated with an organic protective material in an embodiment. The organic protective material is an amine with carbon number of from 8 to 12 in an embodiment. The amine can be selected from the group consisting of octylamine, nonylamine, decylamine, dodecylamine and a combination thereof in an embodiment. The amine can comprise octylamine in another embodiment. By coating fine silver particles with the amine, it is possible to suitably hold the distance between adjacent fine silver particles so as to prevent the sintering of the fine silver particles with each other.

The particle diameter (D50) of the fine silver particles is 50 to 300 nm in an embodiment, 55 to 250 nm in another embodiment, 75 to 210 nm in another embodiment, 95 to 180 nm in another embodiment. The particle diameter (D50) of the fine silver particles after dispersion in solvent is the $50_{th}$ percentile diameter in a volume-based particle diameter distribution that can be measured by Dynamic Light Scattering (Nanotrac Wave-EX150, NIKKISO CO., LTD.).

Content of the fine silver particles is 65 to 95.4% by weight, 65 to 90% by weight in an embodiment, 68 to 88% by weight in another embodiment, 70 to 87% by weight in another embodiment, based on the weight of the fine silver particle dispersion.

Solvent

The fine silver particles are dispersed in a solvent. In an embodiment, a boiling point of the solvent is 150 to 350° C., 175 to 310° C. in another embodiment, 195 to 260° C. in another embodiment.

The solvent is selected from the group consisting of diethylene glycol monobutyl ether, diethylene glycol dibutyl ether, diethylene glycol monobutyl ether acetate, terpineol, and any mixture thereof in an embodiment.

Content of the solvent is 4.5 to 34.5% by weight, 9.05 to 34.5% by weight in an embodiment, 11.1 to 31.5% by weight in another embodiment, 12.15 to 29.5% by weight in another embodiment, based on the weight of the fine silver particle dispersion.

Ethyl Cellulose

The fine silver particle dispersion comprises 0.1 to 1.0% by weight of ethyl cellulose. A weight average molecular weight of the ethyl cellulose is 10,000 to 120,000.

Without being bound by any theory, it is believed that incorporating certain combinations of ethyl cellulose and solvent in a silver particle dispersion enhances the dispersion stability.

The weight average molecular weight of the ethyl cellulose is 10,000 to 120,000, which enables the fine silver particle dispersion to form an electrically conductive thick film with a good surface smoothness and low resistivity and which imparts good storage stability of resistivity to the dispersion. The weight average molecular weight is 23,000 to 110,000 in an embodiment, 30,000 to 105,000 in another embodiment, 50,000 to 90,000 in another embodiment, and 65,000 to 85,000 in another embodiment.

Ethyl cellulose is commercially available from Dow Chemical Company under the tradename ETHOCEL®. Exemplary grades useful in the present dispersion include ones available as ETHOCEL® STD 4 (Mw: 44046), STD 7 (Mw: 55205), STD 10 (Mw: 77180), STD 14, and STD 20 (Mw: 105059).

The content of ethyl cellulose can be 0.1 to 1.0% by weight based on the weight of the fine silver particle dispersion. When the content is lower than 0.1 by weight, it is difficult to prepare a dispersion. When the content is larger than 1.0% by weight, low resistivity cannot be obtained regarding an electrically conductive thick film formed from the fine silver particle dispersion. The content of ethyl cellulose is 0.2 to 0.95% by weight in an embodiment, 0.3 to 0.9% by weight in another embodiment, 0.5 to 0.85% by weight in another embodiment, and 0.6 to 0.9% by weight in another embodiment.

Substance with a Large Molecular Weight

In some aspects, the fine silver particle dispersion of the present invention can include substantially no substance with a large molecular weight. Specifically, content of a substance having a weight average molecular weight of 150,000 or more in the fine silver particle dispersion is 0.25% by weight or less, 0.09% by weight or less, 0.05% by weight or less, 0.03% by weight or less in an embodiment, or 0.02% by weight or less in another embodiment. It is presumed that this kind of large molecule inhibits sintering of the fine silver particles, leading to a high resistivity of the electrically conductive thick film. Further, the substance may lower the surface smoothness of the electrically conductive thick film. As an example, this large molecular weight substance can be a polymer or a combination of polymers, including other ethyl cellulose polymers.

The fine silver particle dispersion comprises no glass frit in an embodiment.

How to Make Fine Silver Particle Dispersion

The fine silver particle dispersion can be produced by a method comprising the steps of: (i) producing fine silver particles by reducing a silver compound in the presence of an organic protective material such as an amine and a reducing agent in water to get a water slurry containing fine silver particles coated with the organic protective material; (ii) removing some of the liquid from the aqueous slurry after decantation to get the fine silver particle; and (iii) adding the concentrated fine silver particle slurry to an ethyl cellulose solution containing at least a solvent and ethyl cellulose. The fine silver particle dispersion can be further put in a nitrogen atmosphere for 12 hours or more to remove the moisture content therein in an embodiment. The temperature of the atmosphere can be room temperature in an embodiment. The temperature of the atmosphere can be heated to between 80 and 100° C. in another embodiment. The moisture can be removed by heating in another embodiment. A vacuum condition also can be available to remove the moisture in another embodiment.

The silver compound is a silver salt or a silver oxide in an embodiment. The silver salt is silver nitrate ($AgNO_3$) in another embodiment. The silver compound is added so that the concentration of silver ions in the water is in the range of 0.01 to 1.0 mol/L in an embodiment, 0.03 to 0.2 mol/L in another embodiment.

The molar ratio of the organic protective material to silver of the silver compound (organic protective material/Ag) is 0.05 to 6 in an embodiment.

The reduction treatment of the silver compound is carried out at 60° C. or lower in an embodiment, 10 to 50° C. in another embodiment. With such temperature, each of the fine silver particles can be sufficiently coated with the organic protective material so as not to aggregate. The reaction time in the reduction treatment is 30 minutes or shorter in an embodiment, 10 minutes or shorter in another embodiment.

Any reducing agent can be used as long as it reduces silver. The reducing agent is a basic reducing agent in an embodiment. The reducing agent is hydrazine or sodium borohydride ($NaBH_4$) in another embodiment. The equivalent ratio of the reducing agent to silver of the silver compound (reducing agent/Ag) is 0.4 to 8.0 in an embodiment.

The fine silver particle dispersion can be further kneaded and degassed by a three-roll mill, a bead mill, a wet jet mill, or an ultrasonic homogenizer in another embodiment.

Viscosity of the fine silver particle dispersion is 30 to 350 Pa·s in an embodiment, 40 to 300 Pa·s in another embodiment, 45 to 280 Pa·s in another embodiment, 50 to 220 Pa·s in another embodiment at shear rate 15.7 $5^{-1}$ at 25° C. The viscosity of the fine silver particle dispersion can be measured by a viscosity measuring apparatus (HAAKE Rheo-Stress 600, Thermo Fisher Scientific Inc.) with C35/2 cone and plate at shear rate 15.7 $5^{-1}$ at 25° C.

Use of the Fine Silver Particle Dispersion

An electrically conductive thick film can be formed by using the fine silver particle dispersion. The electrically conductive thick film may be used to form a circuit, an electrode or an electrically conductive bonding layer in an embodiment.

A method of manufacturing an electrically conductive thick film comprising steps of: (a) applying a fine silver particle dispersion on a substrate, wherein the fine silver particle dispersion comprises, (1) 65 to 95.4% by weight of fine silver particles which have an average primary particle diameter of 10 to 190 nm and which comprise 25% by number or less of silver particles having a primary particle diameter of 100 nm or larger, (2) 4.5 to 34.5% by weight of a solvent, (3) 0.1 to 1.0% by weight of ethyl cellulose having a weight average molecular weight of 10,000 to 120,000; and heating the applied fine silver particle dispersion at 80 to 1000° C.

There is no restriction on the substrate. The substrate can be a polymer film, a glass substrate, a ceramic substrate, a semiconductor substrate or a metal substrate in an embodiment.

The fine silver particle dispersion is applied by screen printing, inkjet printing, gravure printing, stencil printing, spin coating, blade coating or nozzle discharge in an embodiment. The fine silver particle dispersion is screen printed on a substrate in another embodiment.

The heating temperature is 900° C. or lower in an embodiment, 820° C. or lower in another embodiment, 700° C. or lower in another embodiment, 550° C. or lower in another embodiment, 410° C. or lower in another embodiment, 320° C. or lower in another embodiment, 260° C. or lower in another embodiment, 160° C. or lower in another embodiment. A heating temperature of 160° C. or lower is suitable for a polymer film substrate which may be susceptible to heat damage. The heating temperature is 70° C. or higher in an embodiment, 100° C. or higher in another embodiment, 120° C. or higher in another embodiment. The heating time is 10 to 200 minutes in an embodiment, 15 to 160 minutes in another embodiment, 20 to 120 minutes in another embodiment, 25 to 95 minutes in another embodiment, 25 to 80 minutes in another embodiment. The fine silver particles can be sufficiently sintered during heating with the temperature and time described above.

The electrically conductive thick film is 1 to 50 µm thick in an embodiment, 2 to 45 µm thick in another embodiment, 3 to 40 µm thick in another embodiment, 4 to 35 µm thick in another embodiment, 5 to 30 µm thick in another embodiment.

An electrical device comprises one or more electrically conductive thick film manufactured using the fine silver particle dispersion of the present invention. The electrical device is selected from the group consisting of a solar cell, an LED, a display, a power module, a chip resistor, a chip conductor, a filter, an antenna, a wireless charger, a capacitive sensor and a haptic device in an embodiment.

Electrically Conductive Paste

The fine silver particle dispersion can be used to form an electrically conductive paste in an embodiment. The electrically conductive paste comprises a fine silver particle dispersion and a glass frit in an embodiment. The glass frit could promote sintering of the fine silver particle and adherence to the substrate during firing.

Particle diameter (D50) of the glass frit can be 0.1 to 7 µm in an embodiment, 0.3 to 5 µm in another embodiment, 0.4 to 3 µm in another embodiment, 0.5 to 1 µm in another embodiment. The particle diameter (D50) is obtained as described above with regard to the fine silver particles.

In an embodiment, softening point of the glass frit can be 310 to 600° C., in another embodiment 350 to 500° C., in another embodiment, 410 to 460° C. When the softening point is in the range, the glass frit can melt properly to obtain the effects mentioned above. Here, the "softening point" is the softening point obtained by the fiber elongation method of ASTM C338-57.

The chemical composition of the glass frit here is not limited. Any glass frits suitable for use in the electrically conductive paste is acceptable. The glass frit comprises a lead silicate glass frit, a lead borosilicate glass frit, a lead tellurium glass frit, a zinc borosilicate glass frit, a lead-free bismuth boron glass frit or any mixture thereof in an embodiment.

The amount of the glass frit can be determined based on the amount of the fine silver particles. The weight ratio of the fine silver particles and the glass frit (fine silver-particles: glass-frit) can be 10:1 to 100:1 in an embodiment, 25:1 to 80:1 in another embodiment, 30:1 to 68:1 in another embodiment, 42:1 to 53:1 in another embodiment. With such amount of the glass frit, sintering of the fine silver particles and adhesion between an electrically conductive thick film and a substrate can be sufficient.

Content of the glass frit is 0.5 to 8 parts by weight in an embodiment, 0.8 to 6 parts by weight in another embodiment, 1.0 to 3 parts by weight in another embodiment based on 100 parts by weight of the electrically conductive paste.

The electrically conductive paste comprises the fine silver particle dispersion and an additional silver powder in another embodiment. The additional silver powder could increase electrical conductivity of a formed electrically conductive thick film.

The particle diameter (D50) of the additional silver powder is 0.4 to 10 µm in an embodiment, 0.6 to 8 µm in another embodiment, 0.8 to 5 µm in another embodiment, 1 to 3 µm in another embodiment.

The particle diameter (D50) of the additional silver powder is determined from a measured distribution of the particle diameters by using a laser diffraction scattering method. Microtrac model X-100 is an example of a commercially-available device useful in carrying out particle size distribution measurements.

The additional silver powder is flaky or spherical in shape in an embodiment.

Content of the additional silver powder is 10 to 60 parts by weight in an embodiment, 18 to 53 parts by weight in another embodiment, 26 to 49 parts by weight in another embodiment based on 100 parts by weight of the electrically conductive paste.

The electrically conductive paste comprises the fine silver particle dispersion, the glass frit and the additional silver powder in another embodiment.

Use of the Electrically Conductive Paste

An electrically conductive thick film can be formed by using the electrically conductive paste. The electrically conductive thick film may form a circuit, an electrode or an electrically conductive bonding layer as described above in an embodiment.

A method of manufacturing an electrically conductive thick film comprises the steps of: (a) applying an electrically conductive paste on a substrate, wherein the electrically conductive paste comprises a fine silver particle dispersion and a glass frit, wherein the fine silver particle dispersion comprises (1) 65 to 95.4% by weight of fine silver particles which have an average primary particle diameter of 10 to 190 nm and which comprise 25% by number or less of silver particles having a primary particle diameter of 100 nm or larger, (2) 4.5 to 34.5% by weight of a solvent, (3) 0.1 to 1.0% by weight of ethyl cellulose having a weight average molecular weight of 10,000 to 120,000; and (b) firing the applied electrically conductive paste at 600 to 1000° C. The electrically conductive paste used in the method of manufacturing an electrically conductive thick film can comprise an additional silver powder instead of or together with the glass frit in another embodiment.

The substrate is a glass substrate, a ceramic substrate or a semiconductor substrate in an embodiment. The electrically conductive paste is applied by screen printing, inkjet printing, gravure printing, stencil printing, spin coating, blade coating or nozzle discharge in an embodiment. The electrically conductive paste is screen printed on a substrate in another embodiment.

The firing temperature is 920° C. or lower in an embodiment, 880° C. or lower in another embodiment, 830° C. or lower in another embodiment, 780° C. or lower in another embodiment. The firing temperature is 650° C. or higher in an embodiment, 700° C. or higher in another embodiment. The firing time is 5 seconds or longer in an embodiment, 30 seconds or longer in another embodiment, 1 minute or longer in another embodiment, 7 minutes or longer in another embodiment, 15 minutes or longer in another embodiment, 25 minutes or longer in another embodiment. The firing time is 200 minutes or shorter in an embodiment, 160 minutes or shorter in another embodiment, 110 minutes or shorter in another embodiment, 95 minutes or shorter in another embodiment, 75 minutes or shorter in another embodiment.

EXAMPLES

Examples 1 and 2

Pure water 125.7 kg as a reaction medium was put in a 200 L of reactor and the temperature was adjusted to 40° C. Octylamine as an organic protective material 2431.2 g and 80% hydrazine hydrate as a reducing agent 230.7 g were added to the reactor. The molar ratio of octylamine to silver (octylamine/Ag) was 2. The equivalent ratio of hydrazine hydrate to silver (hydrazine hydrate/Ag) was 2.0. The mixture in the reactor was stirred at 158 rpm with a stirring rod having impellers. Nitrogen gas as an inert gas was blown into the reactor at a flow rate of 20 L/min. An aqueous solution of 1253.6 g of a silver nitrate (Toyo Kagaku Inc.) dispersed in 6702.6 g of pure water was added to the reactor. A water dispersion containing fine silver particles coated with octylamine was obtained by stirring the mixture at 158 rpm in the reactor for another two minutes.

To measure the primary particle diameter of the fine silver particles made above, a few drops of the water dispersion were placed on a glass substrate. The water dispersion on the glass substrate was dried at 60° C. so that the fine silver particles remained. An image picture of the fine silver particles remained on the glass substrate was taken by a scanning electron microscope (SEM) (S-4700 produced by Hitachi High-Technologies Corporation) at 50,000-times magnification and analyzed by image analysis software (A-zo-kun®, Asahi Kasei Engineering Corporation). The diameters of more than 100 primary particles were measured and average primary particle diameter thereof was obtained. SEM images with aggregated particles and irregular-shaped particles were determined to be immeasurable.

The measured average primary particle diameter was 57.8 nm. The dispersion comprised 5% by number or less of silver particles having primary particle diameter of 100 nm or larger.

The wet fine silver particles in the water dispersion were collected by decantation where most of the liquid was removed after fine silver particles sedimentation.

Ethyl cellulose (ETHOCEL™ STD 10, Mw: 77,180, Tg: 130° C., Dow Chemical Company) was dissolved in diethylene glycol monobutyl ether (DGBE) and stirred for 6 hours at 60° C. by a magnetic stirrer. The stirring speed was 1000 rpm.

DGBE was a polar solvent having a boiling point of 230° C. and a solubility parameter value of 9.5.

Wet fine silver particles obtained above were dispersed in the ETHOCEL™ STD 10 solution. The fine silver particle dispersion was obtained by drying the mixture of the wet fine silver particles and the resin solution at 30° C. under vacuum for 8 hours to remove the water therein. The amount of components of the fine silver particle dispersion is shown in Table 1.

The secondary particle diameters (D50) of the fine silver particle dispersions of Example 1 and Example 2 were measured by Dynamic Light Scattering (Nanotrac Wave-EX150, NIKKISO CO., LTD.). A 10,000-fold dilution of the fine silver particle dispersion was made by adding DGBE to the fine silver particle dispersion followed by sonication with an ultrasonic bath. The 10,000-fold dilution of the fine silver particle dispersion was used for the particle diameter (D50) measurement. The results are shown in Table 1.

TABLE 1

| (wt. %) | Example 1 | Example 2 |
|---|---|---|
| Silver particles | 80.9 | 79.9 |
| ETHOCEL ™ STD 10 | 0.7 | 0.9 |
| DGBE solvent | 18.4 | 19.2 |
| Average primary particle diameter | 57.8 nm | |
| D50 | 134.7 nm | 157.5 nm |

The fine silver particle dispersion of Example 1 was coated on a glass substrate and fired at 130° C.×30 min by a hot-air dryer to prepare an electrically conductive thick film.

Thickness and surface roughness of the fired film were measured by a thickness measuring apparatus (SURFCOM 1500DX, Toyo Precision Parts MFG Co., Ltd.). Operation range of the measurement was 10 mm and scanning speed was 0.6 mm/s. Surface roughness of the fired film was obtained as Ra value by this measurement. Volume resistivity of the fired film was measured by a surface resistance measuring apparatus (MCP-T610, Mitsubishi Chemical Analytech). The results are shown in Table 2.

TABLE 2

| | Example 1 |
|---|---|
| Thickness | 8.55 μm |
| Surface roughness | 0.082 μm |
| Volume resistivity | 6.40 μΩ · cm |

An electrically conductive thick film was formed from the fine silver particle dispersion of Example 2 immediately after preparation of the dispersion and volume resistivity was evaluated in similar manner to Example 1 except for firing the coated dispersion for 60 min.

Separately, a part of the dispersion was stored at 25° C. for 3 months and volume resistivity was evaluated in the same manner (130° C.×60 min). The results are shown in Table 3.

TABLE 3

|  | Example 2 |
| --- | --- |
| Volume resistivity | 3.8 μΩ · cm |
| Volume resistivity after 3 month storage | 3.9 μΩ · cm |

Example 3

It was attempted to prepare a fine silver particle dispersion in the same manner as in Example 1 except that ETHO-CEL™ STD 10 was not added. As a result, composition as a dispersion where the silver particles were dispersed in the solvent was not obtained.

Example 4

A fine silver particle dispersion was prepared in the same manner as in Example 1 except that the composition of the dispersion was changed as shown in the table 4.

TABLE 4

| (wt. %) | |
| --- | --- |
|  | Example 4 |
| Silver particles | 86.2 |
| M1400 | 2.6 |
| DGBE solvent | 11.2 |

M1400 is an acrylic resin available from SEKISUI CHEMICAL CO., LTD. whose Mw is about 25,000.

Storage stability was evaluated regarding the fine silver particle dispersion obtained above in the same manner as in Example 2. The results are shown in Table 5.

TABLE 5

|  | Example 2 | Example 4 |
| --- | --- | --- |
| Volume resistivity | 3.8 μΩ · cm | 12.9 μΩ · cm |
| Volume resistivity after 3 month storage | 3.9 μΩ · cm | Unmeasurably high |

It is presumed that the storage stability is enhanced by increasing the resin (ETHOCEL™ STD 10 or M1400) content in the dispersion because the resin inhibits collision of particles. The dispersion used in Example 4 contained a larger amount of resin (M1400) than Example 2. However, its storage stability was poor.

Example 5

Polyvinyl alcohol (PVA) (Mw: about 90,000) was used instead of ETHOCEL™ STD 10 in Example 1. It was attempted to disperse the PVA and the silver particles in the solvent (DGBE). However, fine silver particle dispersion was not obtained.

Example 6

A fine silver particle dispersion was prepared in the same manner as in Example 1 except that, as ethyl cellulose, 0.6% by weight of ETHOCEL™ STD 10 and 0.1% by weight of ETHOCEL™ STD 100 (Mw: about 180,000) were used.

Volume resistivity and surface roughness of an electrically conductive thick film were evaluated in the same manner as in Example 1 (130° C.×30 min). The results are shown in Table 6.

TABLE 6

|  | Example 6 |
| --- | --- |
| Thickness | 9.30 μm |
| Surface roughness | 0.371 μm |
| Volume resistivity | 38.1 μΩ · cm |

In the results, surface roughness and volume resistivity were inferior to Example 1.

Example 7

It was attempted to prepare a fine silver particle dispersion in the same manner as in Example 1 except that ETHO-CEL™ STD 100 was used instead of ETHOCEL™ STD 10. As a result, composition as a dispersion where the silver particles were dispersed in the solvent was not obtained (the silver particles and the solvent were clearly separated).

Example 8

A fine silver particle dispersion was prepared in the same manner as in Example 1 except that the composition of the dispersion was changed as shown in the table 7, and volume resistivity of an electrically conductive thick film was evaluated in the same manner as in Example 1.

TABLE 7

| (wt. %) | |
| --- | --- |
|  | Example 8 |
| Silver particles | 79.9 |
| ETHOCEL ™ STD 10 | 1.2 |
| DGBE solvent | 18.9 |
| Volume resistivity | 48.0 μΩ · cm |

In the result, volume resistivity was inferior to Example 1.

What is claimed is:

1. A conductive paste comprising a fine silver particle dispersion and a glass frit, wherein the fine silver particle dispersion comprises:
   (1) 65 to 95.4% by weight of fine silver particles which have an average primary particle diameter of 10 to 190 nm and which comprise 25% by number or less of silver particles having a primary particle diameter of 100 nm or larger,
   (2) 4.5 to 34.5% by weight of a solvent, and
   (3) 0.1 to 1.0% by weight of ethyl cellulose having a weight average molecular weight of 10,000 to 120,000.

2. The conductive paste of claim 1, wherein the fine silver particles are coated with an organic protective material.

3. The conductive paste of claim 2, wherein the organic protective material is an amine with carbon number of from 8 to 12.

4. The conductive paste of claim 1, wherein a boiling point of the solvent is 150 to 350° C.

5. The conductive paste of claim 1, wherein the solvent is selected from the group consisting of diethylene glycol monobutyl ether, diethylene glycol dibutyl ether, diethylene glycol monobutyl ether acetate, terpineol, and any mixture thereof.

6. The conductive paste of claim 1, wherein the ethyl cellulose has a weight average molecular weight of 30,000 to 105,000.

7. The conductive paste of claim 1, wherein the ethyl cellulose has a weight average molecular weight of 50,000 to 90,000.

8. The conductive paste of claim 1, wherein the fine silver particle dispersion comprises 0.3 to 0.9% by weight of the ethyl cellulose.

9. The conductive paste of claim 1, wherein the fine silver particle dispersion comprises 0.6 to 0.9% by weight of the ethyl cellulose.

10. The conductive paste of claim 1, wherein the fine silver particles have an average primary particle diameter of 25 to 110 nm.

11. The conductive paste of claim 1, wherein the fine silver particle dispersion comprises 70 to 87% by weight of the fine silver particles.

12. The conductive paste of claim 1, wherein the fine silver particles comprise 15% by number or less of silver particles having a primary particle diameter of 100 nm or larger.

13. The conductive paste of claim 1, wherein an amount of a substance having a weight average molecular weight of 150,000 or more in the fine silver particle dispersion is 0.09% by weight or less.

14. The conductive paste of claim 1, wherein the fine silver particle dispersion comprises 11.1 to 31.5% by weight of the solvent.

15. The conductive paste of claim 1, wherein an amount of a substance having a weight average molecular weight of 150,000 or more in the fine silver particle dispersion is 0.05% by weight or less.

\* \* \* \* \*